US005491473A

United States Patent [19]

Gilbert

[11] Patent Number: 5,491,473
[45] Date of Patent: Feb. 13, 1996

[54] SYSTEM FOR REMOTE DATA COLLECTING, METHOD IMPLEMENTED IN THIS SYSTEM AND DATA COLLECTOR DEVICE

[75] Inventor: Jérôme Gilbert, Levallois Perret, France

[73] Assignees: Euro CP S.A.R.L., L'Hay les Roses; IMS France, Montrouge, both of France

[21] Appl. No.: 131,697

[22] Filed: Oct. 5, 1993

[30] Foreign Application Priority Data

Mar. 31, 1993 [EP] European Pat. Off. ............. 93400829

[51] Int. Cl.⁶ .................................................. G08B 23/00
[52] U.S. Cl. ................... 340/870.01; 340/870.03; 340/870.02
[58] Field of Search ...................... 379/106–107, 379/102; 380/23, 28, 42, 50; 340/870.03, 870.13, 310 A, 310 C, 825.14, 825.15, 870.02

[56] References Cited

U.S. PATENT DOCUMENTS

| | | | |
|---|---|---|---|
| 4,232,295 | 11/1980 | McConnell | 340/152 |
| 4,557,063 | 12/1985 | Bloom | 40/5 |
| 4,644,320 | 2/1987 | Carr et al. | 340/310 |
| 4,713,837 | 12/1987 | Gordon | 379/93 |
| 5,193,111 | 3/1993 | Matty et al. | 379/106 |
| 5,371,858 | 12/1994 | Miller et al. | 395/275 |
| 5,404,136 | 4/1995 | Marsden | 340/870.03 |

FOREIGN PATENT DOCUMENTS

| | | |
|---|---|---|
| 0176072 | 4/1986 | European Pat. Off. |
| 0264311 | 4/1988 | European Pat. Off. |
| WO89/08959 | 9/1989 | WIPO. |

OTHER PUBLICATIONS

By G. Alspaugh et al., "Buffered and Unattended Dial Unit", Apr. 1981, vol. 23, No. 11, pp. 5023–5024, IBM Technical Disclosure Bulletin.

*Primary Examiner*—Brent A. Swarthout
*Assistant Examiner*—Ashok Mannawa
*Attorney, Agent, or Firm*—Young & Thompson

[57] ABSTRACT

At each local data collection site, the local collection devices are arranged so as to identify and collect the data originating from acquisition devices, which data is transported on a first communication network serving the local site, and containing a local storage device for storing this data. The central site contains a device for transferring, via a second communication network, the data stored in each local site in the local collection device to the central monitoring and processing device, each data transfer being asynchronously initiated by the local collection device concerned at a moment in time or within a time interval which has been determined beforehand and communicated by the central monitoring and processing device.

23 Claims, 4 Drawing Sheets

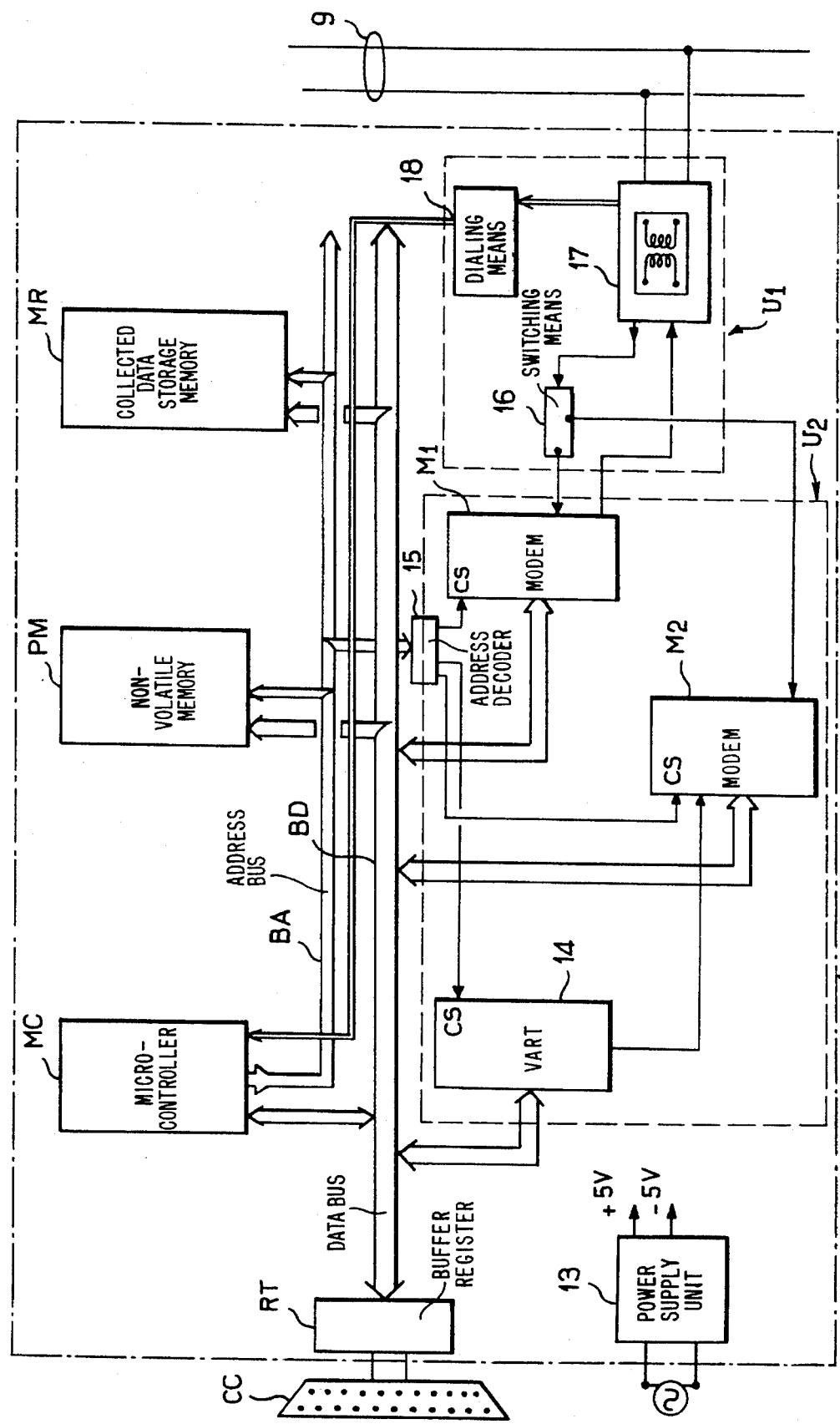
FIG_3

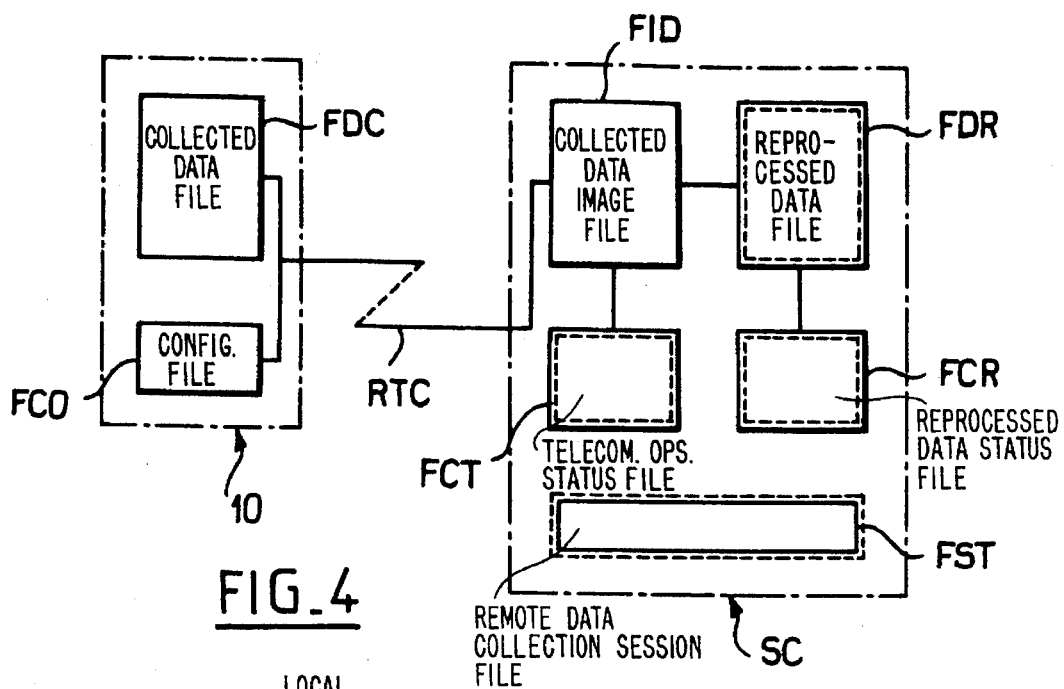
FIG._4
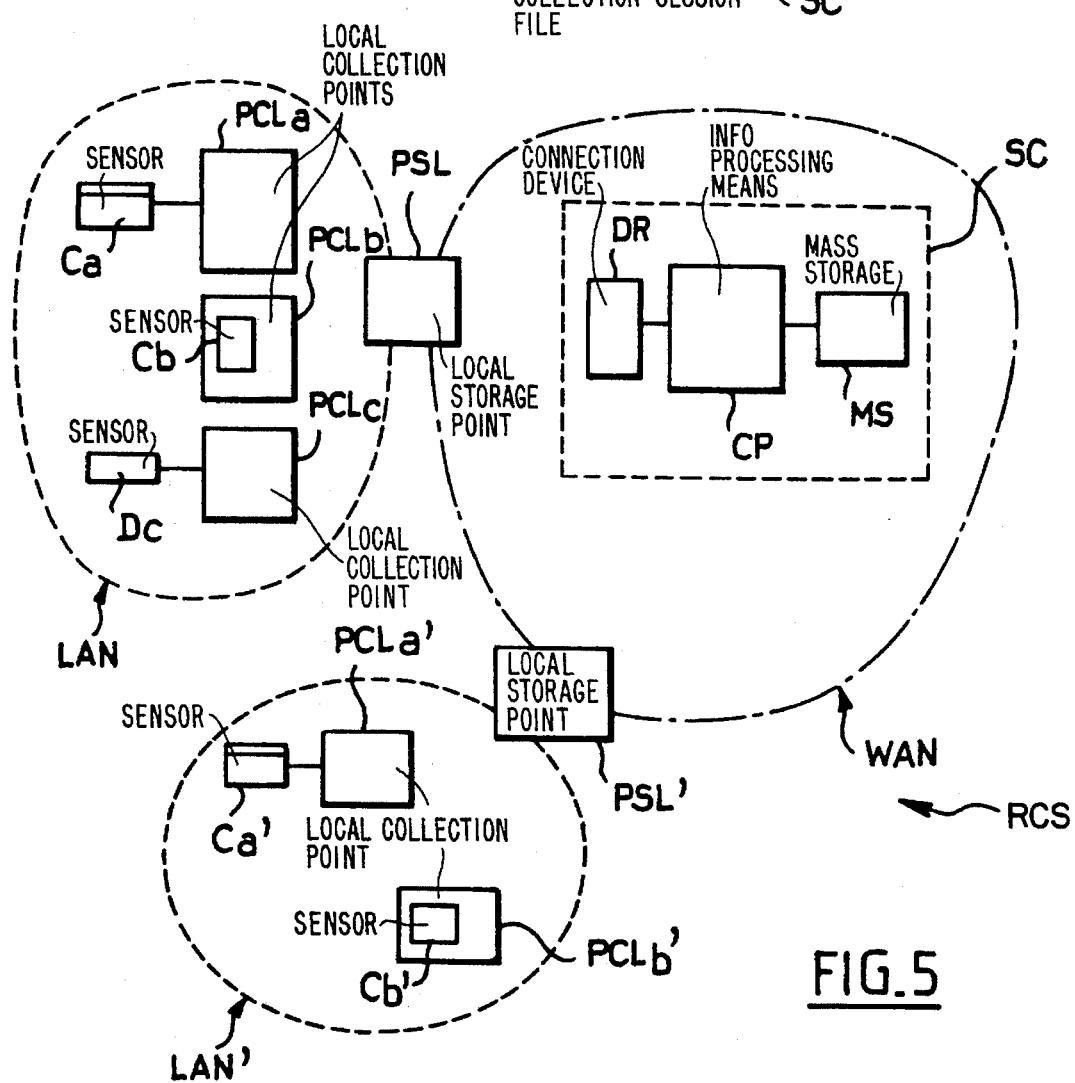
FIG._5

SYSTEM FOR REMOTE DATA COLLECTING, METHOD IMPLEMENTED IN THIS SYSTEM AND DATA COLLECTOR DEVICE

BACKGROUND OF THE INVENTION

1. Field of the Invention

The present invention relates to a system for remote data collection. It also relates to a method implemented in this system and a data collection device.

2. Description of the Related Art

The collection of data from geographically scattered sites, in particular points of sale, carried out for statistical purposes takes on a considerable economic significance when it constitutes, for example, one of the links in a process for profit calculation. Such collection must be carried out under the best possible reliability conditions without, however, generating excess work, while offering great flexibility of processing in particular with regard to the type of data to be collected and to be processed.

A system for collecting statistical data is already known from the French Patent Application No. 2635626 of 18th August 1988 in the name of IMS FRANCE. However, this system has the drawback of making rational use of the server center difficult due to the fact that it is the collection devices which have control of the call times and that internal clock derivatives of these devices have already been observed.

Moreover, the problem of adapting the system exists since it is necessary to provide identification of new communication protocols.

Numerous remote information collecting systems are already known, in particular for the measurement of physical variables, or more generally of data acquired at local sites.

Thus the document IBM Technical Disclosure Bulletin (Vol. 23 No. 11 April 1981) discloses a remote collection device designed to transfer collected data at pre-determined times, via a telephone line, to a remote computer. It is stated that the time for automatic dialling can be programmed so it can be modified by the remote computer during a connection. This remote collection device includes local means of storing, monitoring and processing means and a modem.

The U.S. Pat. No. 4,713,837 (GORDON) describes a communication network between dwellings and a central communication and processing site, intended for the collection of information relating to the measurement of power, gas and water consumption. This remote collection system uses a public telephone network for the transfer of measurement data collected at the level of a local site to the central site. At the level of a dwelling unit, the various measurement data is collected via input/output channels connecting meters to a local collection unit.

The U.S. Pat. No. 4,232,295 (McCONNELL) describes a system for sampling appliances of a "juke-box" type via a telephone network. At the level of each juke-box a data collector and a modem are provided, which are arranged so as to collect and transfer data relative to the use of this appliance to a central site. In this system, it is the central site which contacts each local site by telephone and requests a transfer of stored information.

The European Patent Application 0264311 (ELF FRANCE) discloses a process for the transmission of information or measurement data from a local measuring device installed at a remote site to a central interrogation station at a central location where the data is processed, by using a public telephone network while allowing normal use of the telephone line. It includes the following stages:

transmission of a first call from the central station to the local station on line of which the bell of the called station is momentarily disabled, repetition, after a certain lapse of time, of the call by the central station, line seizure, execution of the transmission procedure.

The International Application PCT WO89/08959 (TELEMETRY RESEARCH) discloses a process for the remote collection of information originating from meters installed in dwellings, in particular power meters, by using a public telephone network. In this system there is also a central site which takes the initiative in establishing communication with the local collecting devices and carries out a sampling operation of all the local sites.

In fact, current remote collection systems have the drawback of requiring complex management of communications between the local sites and the central site. Now, the main difficulties of remote collection reside in the reliability and the availability of telecommunication media. Therefore, ill-timed or unsuccessful calls contribute to considerably lowering the efficiency and therefore the usefulness of remote collection.

SUMMARY OF THE INVENTION

The aim of the invention is to overcome these drawbacks by proposing a system for remote data collection from a set of local collection sites to a central site which contains central monitoring and processing means, each local site containing local means for data collection and being connected to a communication network.

According to the invention, the remote data collection system is characterized in that:

at each local site, the local collection means are arranged so as to identify and collect data originating from acquisition devices which is transmitted over a first local area network serving said local site, and include local means for storing this data, and in that moreover the central site includes means for receiving via a second network, in particular a telephone network, the data stored at each local site in the local collection means in order to be processed by the central means of monitoring and processing, each data transfer being initiated by the local collection means concerned at a moment in time which has been determined beforehand and communicated by the central means of monitoring and processing.

In this way, with the system according to the invention, the data collected locally is not processed locally, but simply stored prior to transfer to a central site where it is then processed, this transfer being controlled at the central site. Consequently it is no longer necessary to provide the local collection means with complex means for the identification of the organisation of the collected data, this identification being transferred to the central site.

The first communication network is a local area network (LAN) which can use wire, fiber-optic or radio-frequency means. This network can be, for example, an electrical distribution network over which a transmission technique by carrier currents is used.

The second network is a wide-area network (WAN) and more generally any network for long-distance communication, with circuit or packet switching or also leased lines. This second network can use any type of hardware medium, in particular wire, fiber-optic or radio-frequency means. This can be, for example, an analog or digital switched telephone network or a cellular radio network.

The local collection means can be designed to collect measurements of physical variables, in particular:

the energy consumed by a load, the power absorbed by a load, the current intensity output to a load, or the voltage at the terminals of a load.

These physical variables may also be temperatures, illuminations, levels, flow rates, or physical variables indicative of pollution.

It can also be envisaged that the local collection means are designed to collect information representing binary states or values originating from adding machines or also any other information available at a collection point, for example, an image capture, financial information (point of sale) or also information relating to evaluation of consumers' responses and behavior to products and services which are offered to them.

According to another aspect of the invention, a remote collection system is implemented in an environment containing several first local area networks and a second wide-area network, characterized in that in addition it contains, for each local area network, local storage points communicating on the one hand, with local collection points via each first network, and, on the other hand, communicating with the central site via the second wide-area network, these local storage points being arranged to store the data collected by the local collection points and to interrogate these local collection points.

Also according to another aspect of the invention, the remote collection procedure employed in the system according to the invention is characterized in that it contains, at each local site, a stage for identifying and collecting data originating from the acquisition devices which is transmitted over a first network, in particular an electrical distribution network, serving this local site, followed by a stage for storing the data locally at the central site, a stage for transferring the said stored data to the central site, followed by a stage for processing the said transferred data, each data transfer being initiated at the local site at a moment in time or during an interval of time determined beforehand and communicated by the central site.

BRIEF DESCRIPTION OF THE DRAWINGS

Other characteristics and advantages of the invention will also be apparent from the description hereafter.

In the attached drawings given as non-limitative examples:

FIG. 3 is a diagram of a particular embodiment of a remote collection device according to the invention;

FIG. 4 shows the organisation of the file management in the system according to the invention; and FIG. 5 shows the general structure of a remote collection system according to the invention using several first local area networks.

DESCRIPTION OF THE PREFERRED EMBODIMENTS

A first embodiment of the system according to the invention as well as the process used will now be described.

Figure 1:
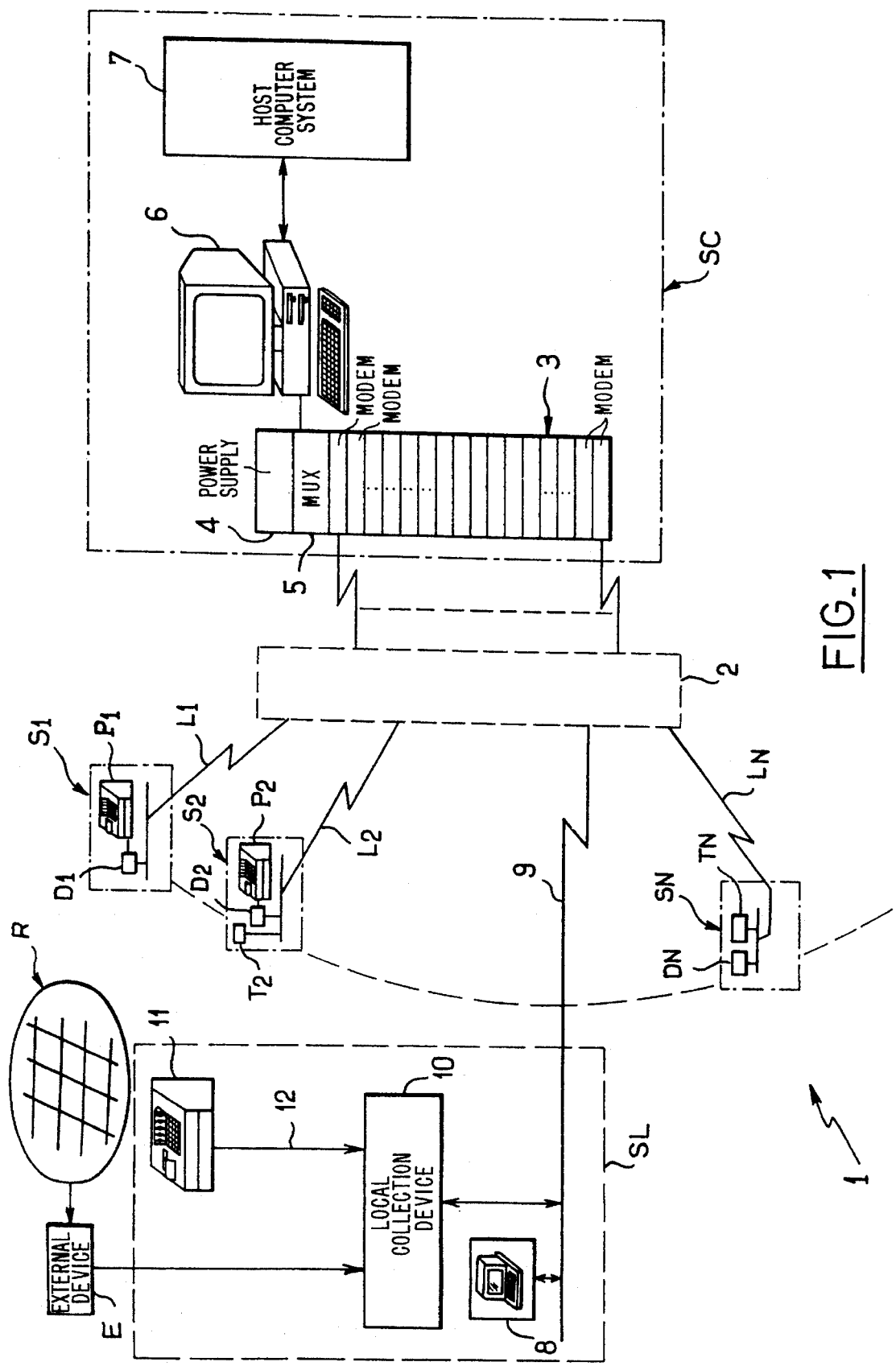
FIG. 1 is a block diagram of a first embodiment of a remote collection system according to the invention.

A remote collection system 1 according to the invention includes, with reference to FIG. 1, monitoring and processing means 3, 6, 7 within a central site SC and local remote-collection devices D1, D2, DN, 10 within a set of local sites S1, S2, SN, SL which can be, for example, pharmaceutical dispensaries or other points of sale. These local sites S1, S2, SN, SL are connected to the central site SC by a set of telephone lines L1, L2, LN, 9 belonging to a telecommunication network, in particular a telephone network 2.

As an example, a first local site S1 can be provided with a payment terminal P1 connected to a local collection device D1, a second local site S2 can be provided with a second payment terminal P2 connected to a second local collection device D2 and a management terminal T2 connected to the telephone line L2, while another local site SN may only be provided with a management terminal TN connected to the telephone line LN. In the case of the use of the system according to the invention for the collection of statistical information relating to inventory control for pharmaceutical dispensaries, a local site SL is generally provided with a terminal 8 intended for the management of orders to different distributors and a conventional payment terminal 11 which can be connected to a local collection device 10 via a Centronics-type connector generally used to connect a printer. Other types of link can also be envisaged, used in parallel or serial mode, for example an RS232C link.

Collection devices arranged to receive data observed on another network can also be envisaged, for example, an electrical distribution network on which carrier current information is transported, as suggested in FIG. 1 in which the collection device 10 is also connected to an external item of equipment E which observes information transported over an electrical energy distribution network R. Of course, the second network can be based on the use of other transmission media, for example, infrared, radio or wire means.

The local collection device 10 and the management terminal 8 are connected to the telephone line 9 of the local site SL. A central remote collection site SC according to the invention includes, with reference to FIG. 1, an electrical power supply unit 4, a multiplexer 5, within a front-end processor 3 containing a set of modulation/demodulation (modem) cards, for example, up to the number 16, each connected to a telecommunication line, and a monitoring and processing unit 6, for example a PC-type micro-computer, generally connected to a host computer system 7. This monitoring and processing unit 6 is designed to perform the following functions:

management of communications between an operator and the system, in particular in the form of window and pull-down menu presentations, demultiplexing of collected data, processing of this data in particular in order to sort it into files of pre-determined format, production of files associated with the telecommunications operations, the non-volatile storage at least temporarily of the files resulting from the operation of the system, management of the operating functions of the remote collection system, in particular:

the configuration of this system, the remote maintenance of the collection devices,
the preparation of call lists allocating different operating parameters and information fields necessary for the operation of the system to each call number.

The telephone lines used by the remote collection system according to the invention can be part of a private and/or public switched telephone network and operate equally well with loop-disconnect or DTMF dialling or any other method of transmission channel access.

The remote collection system according to the invention can be advantageously applied to collecting data relating to electrical energy consumption in dwellings and more generally on any premises.

Figure 2:
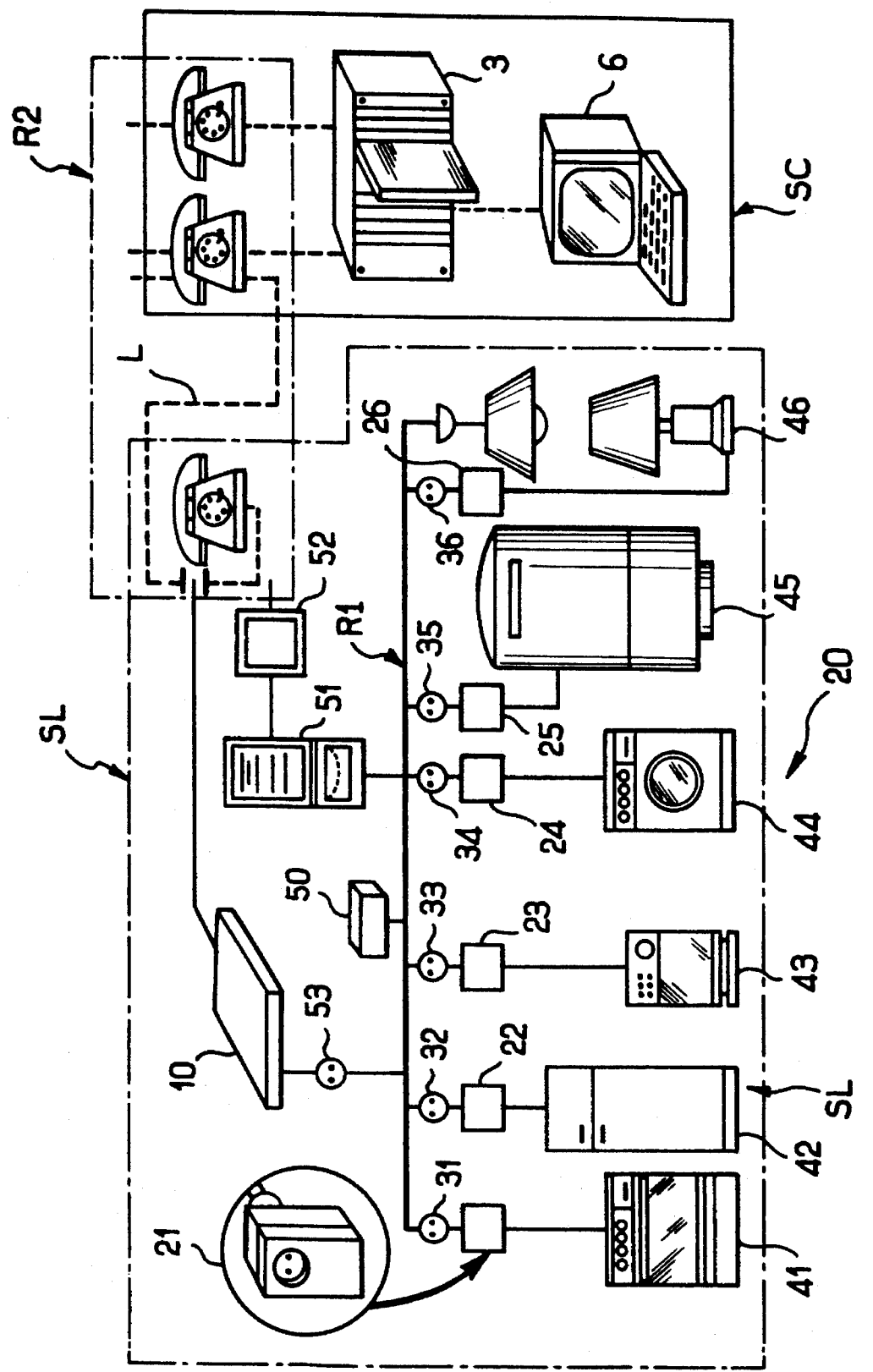
FIG. 2 is a block diagram of a second embodiment of a remote collection system according to the invention applied to the remote collection of energy consumption information in dwellings.

Therefore, with reference to FIG. 2, a remote collection system 20 includes a central site SC provided with a control and processing unit 6, a communication device 3 and in each dwelling concerned with this system and representing a local system SL, a local collection device 10 connected on the one hand, via the local electrical energy distribution network R1, to intermediate sockets 21–26 inserted between the electric plugs 31–36 and the electrical equipment 41–46, and on the other hand, via a second telecommunication network R2, for example the telephone network, to the central site SC. In practice the local collection device 10 is connected to the telecommunication network R2 by a telephone line L. The electrical equipment concerned can be domestic electrical appliances such as a cooker 41, a refrigerator or deep-freeze 42, an item of electrical heating equipment 43, a washing machine 44, an electrical water-heater 45 or also lighting devices 46. Each intermediate socket continuously records the energy consumed by the electrical equipment to which it is connected. When an intermediate socket 21–26 receives a read command originating from the local collection device 10, for example in the form of a reading pulse, it then stores measurement information of the energy consumed, power and voltage measurement information and transmits this information to the local collecting device 10 via the electrical distribution network R1 by a conventional transmission process using carrier currents. The local collecting device 10 transmits the set of collected data to the central site SC via the second telecommunication network R2 during a predetermined time window or at a pre-determined moment in time which has been communicated to it beforehand by the central site during a previous call.

A power acquisition module 50 can also be connected to the local area network R1 in order to acquire data corresponding to currents which exceed a predetermined current limit, for example 16 A. This acquisition module 50 can be, for example, employed to measure the energy of a set of electrical equipment.

A communication interface 52 can also be envisaged between an electronic electricity meter 51 installed at the front of the local energy distribution network R1 and the telephone line L.

Each local collection device 10 contains, with reference to FIG. 3, a monitoring and processing unit, for example, a microcontroller MC, a PROM, EPROM, flash EPROM or EEPROM type non-volatile memory MP containing the program executed by the microcontroller MC, a memory for storing the collected data MR, for example, of backed-up RAM, EEPROM, flash EPROM or hard disk type and communication circuits. These communication circuits include a first interface set U1 with the telephone line 9 containing activity detection means, dialling means 18, line seizure means 17 and switching means 16, a communication set U2 containing for example two modulation/demodulation (modem) circuits M1, M2 and a universal asynchronous receiver transmitter (UART) circuit 14 connected to these modulation/demodulation circuits M1, M2. The afore-mentioned circuits are all connected to a data bus BD with which the microcontroller MC and the memories MP and MR are interfaced. An address bus BA controlled on input by the microcontroller MC is connected at least partially to the memory circuits MP, MR and to an address decoder 15 which provides in particular chip select signals (CS) to the different communication circuits. The collection device is also equipped with a power supply unit 13 ensuring an appropriate supply of electrical energy to the different circuits of the device and a connector CC which allows external connection to the data bus BD via a buffer register RT.

It should be noted that the control programs of the collection device can be downloaded from the central site via the collection system means according to the invention.

The use of the remote collection system according to the invention requires a database which allows files to be produced or imported in ASCII format. Of course conversion programs can be envisaged which are used so as to allow the processing of data within the framework of a database which does not directly integrate data in ASCII format.

The transfer via the switched telephone network of data which has been collected and stored beforehand to the central processing site is carried out using conventional file transfer methods, on the initiative of each collection device within a time window communicated by the central site during a previous call.

No data processing is carried out in the collection devices, all processing being performed at the level of the remote collection center. In particular the data collected is not filtered in the collection devices.

With reference to FIG. 4, the remote collection system according to the invention uses a set of files stored in the local collection devices and the central site SC. Each local memory contains an FDC file of the data collected and an FCO file of the configuration of the local collection device 10. Within the computer workstation 6 at the central site SC, the collection system according to the invention manages an FID file which is the same data collected at each local collection device, a set of files intended for the computer system of the operator containing an FDR file of reprocessed data, an FCT file of the status of telecommunication operations and an FCR file of the status of data reprocessing, and an FST file of the remote collection session provided by the computer system of the operator if the latter wishes to automate the use of the system.

The parameters governing the operation of the collection devices and stored in a non-volatile manner can be modified remotely from the central site. A field which is representative of an operating profile can be advantageously envisaged which can, for example, assume a numerical value from 1 to 99, inclusive. A separate screen is associated with each value of the operating profile which shows in an explicit manner the functional choices chosen from the options available. A main screen arranged as a control panel offers an overall view of the call list. The user of the central site can therefore carry out printout, modification and back-up operations for the parameters associated with an operating profile by selecting the "Operating profile" field associated with each telephone number.

When the storage memory of the collection device is full, an indication is sent by the microcontroller at the time of the next data transfer, so as to alert the central site of the status.

At the end of each successful remote data collection, the central site transmits to the collection device concerned the current date and time, the time of the next call, as well as, optionally, data leading to modifications in the operating conditions of the local site during the next period of data capture. Each successful remote collection causes the resetting of the storage memory pointers so as to release all the available memory space to store the data which will be collected during a future data capture session.

In a more general form for implementing the invention, with reference to FIG. 5, a remote collection system RCS according to the invention can be envisaged which uses several communication networks, for example, two LAN, LAN' (Local Area Network) networks, and a WAN (Wide Area Network) telecommunication network. Each LAN, LAN' can accommodate several local collection points $PCL_a$, $PCL_b$, $PCL_c$; $PCL_a'$, $PCL_b'$. Some local collection points $PCL_a$, $PCL_a'$ collect, for example, data originating from external sensors $C_a$, $C_a'$, other local collection points $PCL_b$, $PCL_b'$ themselves have built-in sensors $C_b$, $C_b'$, while local collection points $PCL_c$ can also be envisaged which are designed to collect data originating from an external device, for example, a management terminal. Local storage devices PSL, PSL' are envisaged which are designed to store information collected within a local area network and to pole the collection points. These local storage devices are coupled to a second WAN network via network connecting points. The central site SC contains a connection device DR to the second WAN, information processing means CP and mass storage means MS.

Each local storage point PSL. PSL' receives and stores information originating from the local collection points $PCL_a$, $PCL_b$, $PCL_c$; $PCL_a'$, $PCL_b'$ with which it is in contact via the first LAN, LAN'.

Within a time window determined by the central site SC and communicated to the local storage point PSL, PSL' during the previous communication, the local storage point PSL takes the initiative of calling the central site SC in order to transfer the data stored locally and to obtain from the central site the new time window for the next call.

Communications between the local storage points PSL, PSL' and the central site SC transit via the second WAN.

Each local collection point $PCL_a$, $PCL_b$, $PCL_c$; $PCL_a'$, $PCL_b'$ can send its data to a corresponding local storage point PSL, PSL':

at determined times, within a determined time window, according to a local event.

Each item of information transmitted from local collection points $PCL_a$, $PCL_b$, $PCL_c$; $PCL_a'$, $PCL_b'$ to local storage points PSL, PSL' can be transmitted on the initiative of local collection points or can have been triggered by the reception of a synchronous data capture command. This command is sent periodically by the local storage point PSL, PSL' of each LAN, LAN' at pre-determined times which can be modified remotely from the central site SC from one collection session to another. Reception of this command causes the capture of information at a precise moment in time and the opening of the session for the transmission of information to the local storage point PSL, PSL' which may be asynchronous.

Time stamping can advantageously take place within the local storage point PSL, PSL', which avoids having a time marking device in the local collection points $PCL_a$, $PCL_b$, $PCL_c$; $PCL_a'$, $PCL_b'$. All the information received in an asynchronous manner by the local storage point PSL, PSL' following the synchronous sending of a collective command for capture and transmission in the form of a reading pulse, can receive the same time stamping in the local storage point PSL, PSL'.

All the local storage points $PCL_a$, $PCL_b$, $PCL_c$; $PCL_a'$, $PCL_b'$ can be advantageously reset to the system time by a master clock at the central site SC during each call.

Thus it is possible to send back time-stamped information to the central site SC in a perfectly synchronous manner originating from a large number of remote local sites. The synchronisation of information capture times allows statistical calculations to be easily carried out over the entire panel constituted by the local sites of the system. These calculations can be carried out by means of conventional tools such as spreadsheets, database management software, etc. For example, the curve of the load of the electrical installations of the panel can be plotted for the different uses, in an overall manner, for example, over 24-hour periods with a resolution of 5 minutes.

A time window is allocated to each local storage point PSL, PSL' in which to call the central site SC in order to transfer to it the data stored in its local memory and to receive in return the new time window corresponding to the next call. This window is calculated by the central site from the number of local collection devices having been attributed a window value starting from the opening time of the remote collection session as well as the number of simultaneous access routes to the telecommunication network.

The advantage of attributing a time window rather than a precise time is that it allows the access time of the second network, the transmission times for the transfer of data and a certain tolerance regarding the time of each operation to be taken into account.

The use within a local storage point of an emergency call number can also be envisaged, so as to allow this local storage point to call the central site outside the normally-envisaged time window, when the normally programmed communication and transfer has not been successful. The actuation of this emergency number can allow intervention by the central site in the form for example of a "back-up" without however disrupting the normal operation of the remote collection. This emergency call should preferably be carried out in working hours so as to allow the intervention of an operator at the central site.

So that the use of networks to which each local site is connected is disturbed as little as possible by this system, the local storage sites PSL, PSL' can be equipped with a priority line seizure detection device so as to interrupt any transmission or transmission attempt if priority use of the second WAN network is detected.

Similarly, the equipment connected to the first LAN, LAN' can employ a network access system designed to systematically postpone access to this network when priority activity has been detected. The intervals of the reading pulses triggering the transfer of information from the local collection points $PCL_a$, $PCL_b$, $PCL_c$; $PCL_a'$, $PCL_b'$ to the local storage points PSL, PSL', as well as, if appropriate, the parameter input conditions before triggering the transfer (transfer according to events) can be advantageously downloaded by the central site SC into the local storage points PSL, PSL' during each call.

Other local operating parameters for the equipment connected to the first network can also be downloaded by the central site SC. For example, the downloading of information relating to the minimum inactivity time before transmission on the first network can be envisaged.

The local collection points $PCL_a$, $PCL_b$, $PCL_c$; $PCL_a'$, $PCL_b'$ can be connected to devices for detecting the presence of human beings, for counting the presence of human beings, for example, for analytical uses regarding how frequently public places are used, for measuring the effectiveness of advertising in sales outlets. The addition of collection capabilities for the operating parameters of external appliances also allows uses for audience measurement for audio-visual media to be envisaged. The current tendency being towards an explosion of audio-visual consumption points in the home, the system according to the invention, thanks to the existence of the local area network, allows the number of information capture points to be increased.

The invention is also particularly well suited to be used in Demand Side Management. In particular, the following tasks can be carried out:

acquisition of an understanding of energy consumptions per use, as a function of time and for given sites, calibration of a statistical analysis system for consumption, verification of the effects of implementing energy saving programs, re-invoicing of consumptions, for example, in the different plots of a camping site.

It can also be envisaged that the remote collection system according to the invention may include local collection devices using non-intrusive methods of estimating a physical variable, for example, the energy consumed at energy consumption points for which it is not possible to install measuring equipment.

Of course the present invention is not limited to the examples which have just been described and numerous arrangements can be applied to these examples without exceeding the scope of the invention.

Thus, a single-channel version of the system and of the process according to the invention can be envisaged. Moreover, the characteristics of the components constituting the collection devices are not limited to those set out in the description and may change in line with the progress expected in this area. Similarly, the system according to the invention can take account of all types of communication protocols without exceeding the scope of the invention. It can also be envisaged that the collection devices according to the invention collect data originating from external observation and capture equipment and capture on any type of network or medium over which the information can be carried, in particular an electrical energy distribution network or networks using other transmission media, for example, infrared, radio or wire means. In addition the switched telephone network to which access is currently mainly analog, may evolve towards digital solutions of ISDN-type without compromising the system according to the invention.

Furthermore, the data collected can be of any type and any origin, for example, the results of physical measurements, in particular of pressure or temperature.

I claim:

1. System for remote data collection comprising:

a plurality of local collection sites, each site comprising at least one means for collecting data, said data collecting means comprising a microcontroller;

data acquisition devices connected to said data collection means and comprising said microcontroller, said data collection means collecting and storing data from said data acquisition devices;

a first local communication network for each local collection site, said first local communication network connecting said data acquisition devices to the data collecting means of said local collection sites;

a central site comprising central monitoring and processing means and at least one means for receiving and transmitting data, said data receiving and transmitting means being connected to said central monitoring and to said processing means, a second communication network connecting said local collection sites and said central site;

said data receiving and transmitting means receiving data transferred from said plurality of local collection sites via said second communication network and transmitting said received data to said central monitoring and processing means for processing;

said data collecting means having means for simultaneously sending a collective data capture command to said data acquisition devices, to thereby cause said data acquisition devices to acquire data at a same time instant, said data acquisition devices further comprising means for transmitting said acquired data in an asynchronous manner to said data collecting means.

2. System according to claim 1, wherein said central monitoring and processing means communicate to the local collection means of each local site time-related informations, during a communication sequence between said local site and the central site.

3. System according to claim 2, wherein said time-related informations include a next transfer moment.

4. System according to claim 2, wherein said time-related informations include a clock synchronization signal.

5. System according to claim 1, wherein said data acquisition devices comprise intermediate sockets each inserted between an electrical supply plug and an item of electrical equipment, said intermediate sockets delivering information representative of an electrical energy consumed by said electrical equipment, said first network being an electrical distribution network supplying said electrical equipment and on which the data generated by said intermediate sockets is transmitted to said local collection means by a transmission process using carrier currents.

6. System according to claim 1, wherein said data acquisition devices comprise intermediate sockets each inserted between an electrical supply plug and an item of electrical equipment, said intermediate sockets delivering information representative of an electrical energy consumed by said electrical equipment, and wherein said first network comprising radio-frequency communications means.

7. System according to claim 6, wherein said intermediate sockets each comprise means for measuring at least one physical variable, means for storing a measurement data, and means for transmitting on said second network said measured and stored data to the local collection means.

8. System according to claim 7, wherein said at least one physical variable comprises a variable representative of an energy consumed by a load.

9. System according to claim 5, wherein said local collection means comprise means for periodically generating on the first network read pulses destined for the intermediate sockets, and, on reception of a read pulse, the intermediate socket records an instantaneous consumption of energy and then transmits said instantaneous consumption of energy to the local collection means.

10. System according to claim 1, wherein said local sites comprise, as said acquisition devices, management terminals connected to telephone lines which are connected to each of said local sites, said local collection means being arranged so as to identify and to selectively store any data transmitted between said management terminals and remote management centers via said telephone lines.

11. System according to claim 1, wherein said local collection means comprise means for collecting measurements of at least one of the following physical variables:

an energy consumed by a load, a power absorbed by a load, a current intensity output to a load, a voltage at the terminals of a load.

12. System according to claim 1, wherein said first local communication network is a Local Area Network (LAN), and said second communication network is a Wide Area Network (WAN), and said local data storage means further comprise means for polling said data collection means to retrieve and store said collected data.

13. Method of remotely collecting data from a plurality of local collection sites, each site comprising at least one means for collecting data, each data collecting means comprising at least one data acquisition device connected to said data collection means and comprising said microcontroller, a first local communication network for each local collection site, said first local communication network connecting said data acquisition devices to said data collecting means of said local collection sites, a central site comprising central monitoring and processing means, and a second communication network connecting said local collection sites and said central site, said method comprising the steps of:

at each of said plurality of local collection sites,
capturing data by said data acquisition devices;
collecting, via said first local communication network, said captured data from said data acquisition devices;
storing said collected data in storage means connected to said data collection means; and at said central site,
transferring said stored data to said central site;
processing said transferred data;

said data capturing steps in each data acquisition device being simultaneously initiated by a collective data capture command sent by said data collection means, to thereby cause said data acquisition devices to acquire data at a same time instant, and said steps of collecting data from each data acquisition devices to said data collection means being asynchronously initiated.

14. Method according to claim 13, wherein, at said central site, said method further comprises a step of:

selectively configuring said local collection means by carrying out a transfer of a set of operating parameters to said local collection means.

15. Method according to claim 13, wherein, at said central site, said method further comprises a step of:

downloading, from said central site to at least one of said data collection means, a program for a management of said local collection means.

16. Method for remote data collection according to claim 13, wherein said local storage means transfer locally stored data to said central site, said transfer taking place at the initiative of said local storage means, said transfer taking place within a time window determined by said central site, said time window being transferred to said local storage means during a previous communication, and said central site, during each transfer, transferring a new time window to said local storage means, said new time window being effective for a next data transfer.

17. Method according to claim 16, wherein said step of transferring collected data from said local collection means to said central site can be triggered by a reception of a simultaneous information capture command, said simultaneous capture command causing a capture of data at a precise moment in time common to all of said local collection means and causing an initiation of a data transmission session during which said data stored in said data collecting means is asynchronously transmitted to said central site.

18. Method according to claim 17, wherein an initiation of said asynchronous information transmission session is synchronized during each transfer by a master clock connected to said central site.

19. Method according to claim 16, wherein a time window is allocated by said central site to each local collecting means, said local collecting means transferring said data stored therein to said central site during said time window, said local collecting means receiving, in response to said data transfer, a new time window effective for a next data transfer.

20. Method according to claim 19, wherein said time window is calculated by said central site from a number of local collecting means having been assigned a time window from a point in time starting with said initiation of said information transmission session, and from a number of simultaneous central site access routes on said second telecommunication network (WAN).

21. Method according to claim 16, wherein said method further comprises a step of postponing a transfer of stored data when an activity having a higher priority than said data transfer has been detected.

22. Process according to claim 16, wherein, at said local collecting means, said method further comprises a step of:

actuating an emergency data transfer when said data transfer within said time window has not been successful.

23. System for remote data collection according to claim 1, wherein said second network is a public telephone network.

* * * * *